(12) United States Patent
Lindqvist et al.

(10) Patent No.: US 10,637,892 B2
(45) Date of Patent: Apr. 28, 2020

(54) ROUTING OF SESSIONS TO OTHER COMMUNICATION NETWORKS

(71) Applicant: Telefonaktiebolaget L M Ericsson (publ), Stockholm (SE)

(72) Inventors: Andreas Lindqvist, Stockholm (SE); Jonas Falkenå, Huddinge (SE); Timo Forsman, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 780 days.

(21) Appl. No.: 14/888,829

(22) PCT Filed: May 6, 2013

(86) PCT No.: PCT/EP2013/059403
§ 371 (c)(1),
(2) Date: Nov. 3, 2015

(87) PCT Pub. No.: WO2014/180496
PCT Pub. Date: Nov. 13, 2014

(65) Prior Publication Data
US 2016/0080429 A1    Mar. 17, 2016

(51) Int. Cl.
*H04L 29/06*     (2006.01)
*H04M 7/12*      (2006.01)

(52) U.S. Cl.
CPC ........ *H04L 65/1016* (2013.01); *H04L 65/103* (2013.01); *H04L 65/104* (2013.01);
(Continued)

(58) Field of Classification Search
CPC ............. H04L 65/1006; H04L 65/1016; H04L 65/103; H04L 65/104; H04M 7/123; H04M 7/1255; H04M 7/1205
See application file for complete search history.

(56) References Cited

U.S. PATENT DOCUMENTS

2005/0286531 A1*  12/2005  Tuohino .............. H04L 29/1216
                                                                  370/395.2
2007/0189268 A1    8/2007  Mitra et al.
(Continued)

FOREIGN PATENT DOCUMENTS

| EP | 1853037 A1 | 11/2007 |
| WO | 2007072462 A2 | 6/2007 |
| WO | 2009068727 A1 | 6/2009 |

OTHER PUBLICATIONS

Stevens, Richard TCP/IP Illustrated vol. 1: The Protocols Addison-Wesley Second Edition 2011 Chapter 11.2 DNS.*
(Continued)

*Primary Examiner* — Jeffrey M Rutkowski
*Assistant Examiner* — Basil Ma
(74) *Attorney, Agent, or Firm* — Coats & Bennett, PLLC

(57) ABSTRACT

System, methods, nodes, and instruction set for routing a session invitation from a first network (101) to a second network (112) are described. The first network (101) and the second network (112) are interconnected via at least two points of interconnect (114, 120). A first control node (124) receives a session invitation to a first user equipment (106), both are part of the first network (101). The first control node (124) determines whether a breakout condition for routing of the session invitation to the second network (112) is fulfilled. If so, a second control node (128) of the first network (101) selects a point of interconnect (114, 120) to the second network (112), considering a capability information characterizing the first control node (124). Therefore the session invitation may be routed in an efficient way from the first network (101) to the second network (112).

24 Claims, 10 Drawing Sheets

(52) U.S. Cl.
CPC ...... *H04L 65/1043* (2013.01); *H04L 65/1069* (2013.01); *H04M 7/123* (2013.01); *H04M 7/1205* (2013.01); *H04M 7/1255* (2013.01)

(56) References Cited

U.S. PATENT DOCUMENTS

| | | | |
|---|---|---|---|
| 2009/0059894 | A1 | 3/2009 | Jackson et al. |
| 2011/0310884 | A1* | 12/2011 | Arauz-Rosado ............................ H04L 29/12594 370/352 |
| 2012/0237014 | A1* | 9/2012 | Gregorat ............. H04L 29/1216 379/220.01 |

OTHER PUBLICATIONS

3GPP TS 23.228 V5.0.0 (Apr. 2001) IP Multimedia Subsystems (Release 5).*

3GPP TS 23.228 IP Multimedia Subsystem (Release 5) (Year: 2001).*

3rd Generation Partnership Project, "3rd Generation Partnership Project; Technical Specification Group Services and System Aspects; IP Multimedia Subsystem (IMS); Stage 2 (Release 11)", Technical Specification, 3GPP TS 23.228 V11.7.0, Dec. 1, 2012, pp. 1-290, 3GPP, France.

3rd Generation Partnership Project, "3rd Generation Partnership Project; Technical Specification Group Core Network and Terminals; IP multimedia call control protocol based on Session Initiation Protocol (SIP) and Session Description Protocol (SDP); Stage 3 (Release 11)", Technical Specification, 3GPP TS 24.229 V11.7.0, Mar. 1, 2013, pp. 1-786, 3GPP, France.

3rd Generation Partnership Project, "3rd Generation Partnership Project; Technical Specification Group Services and System Aspects; IP Multimedia Subsystem (IMS); Stage 2 (Release 12)", Technical Specification, 3GPP TS 23.228 V12.0.0, Mar. 1, 2013, pp. 1-290, 3GPP, France.

* cited by examiner

ROUTING OF SESSIONS TO OTHER COMMUNICATION NETWORKS

TECHNICAL FIELD

The present invention relates to telecommunications and in particular to system, methods, nodes and computer program for routing of sessions to other communication networks.

BACKGROUND

Deployments of IMS (IP Multimedia Subsystem) based communication networks are progressing worldwide. In a typical deployment scenario an IMS network is built up as a parallel network to an existing PSTN (Public Switched Telephone Network), wherein the IMS network and the PSTN are usually operated by different network operators, or by different divisions of a large operator.

In large countries the geographical area of the country is divided into regions. This division is usually driven by the density of the population. Communication networks follow this sub-structuring by offering communication services in the different regions, wherein the different regions may be served by different network operators.

In order to allow people to communicate freely with each other although belonging to different network operators, the IMS network and the PSTN network are interconnected via so called POIs (Point of Interconnect). At these POIs telephone calls are routed between the peering networks. The routing of a telephone call from the own network to a peering network is also known as breakout from the own network.

This scenario is depicted in more detail in FIG. 1. Region 1 100 and region 2 102 are both covered by the IMS based communication network 101 and by the PSTN 112. The region 1 100 and region 2 102 of the IMS network 101 are using a common IP Backbone transport network 110.

The IMS network 101 and the PSTN 112 are interconnected at the POI 114 in region 100 and at POI 120 at region 102.

The IMS network 101 comprises, among other nodes, the IMS infrastructure nodes MGCF 116 (Media Gateway Control Function) handling POI 114 in region 1 100, MGCF 122 handling POI 120 in region 102, a S-CSCF 124 (Serving Call Session Control Function), a TAS 126 (Telephony Application Server) implementing the subscriber services, and a BGCF 128 (Breakout Control Function) controlling the breakout of sessions from the IMS network 101 to the PSTN 112. The S-CSCF 124, TAS 126, and the BGCF 128 are located in region 1 100, while in the region 2 102 none of such nodes (124, 126, 128) are located. This is a typical deployment where the main IMS infrastructure nodes are located centrally in very few regions only.

Now looking closer at a simplified view of routing of a session invitation, a UE (user equipment) A 104 in region 1 100 initiates a session invitation to a UE B 106 in region 2 102. The routing path is illustrated by the solid line 150. The session invitation is routed to the S-CSCF 124 allocated to the B-subscriber using UE B 106, which then involves the TAS 126 for handling the terminating services for the B-subscriber. Then the session is delivered to the UE B in region 2 102. Since the session is routed using the transport IP backbone 110 of the IMS network 101, the handling of the session is very efficient as the entire session can be handled within the IMS network 101.

Now the B-subscriber using UE B 106 activates a forwarding service, for example unconditional session forwarding to a UE C 108 of the PSTN 112. The forwarding service is executed in the TAS 126, and the resulting routing path is illustrated by the dashed line 160. The S-CSCF 124 determines the breakout condition and routes the session invitation to the BGCF 128 for breakout handling. Here it is assumed that the B-subscriber does not have a TEL IMPU (Telephony IP Multimedia Public Identity), but only a SIP IMPU (Session Initiation Protocol IP Multimedia Public Identity) with a common domain part for all subscribers in region 1 100 and region 2 102, for example subscribername@sip.IMSoperator.com. Here "IMSoperator" would correspond to the common domain part. So the common domain part would not reveal in which region the UE B 106 is located.

Since the BGCF 128 cannot derive where the UE B 106 or the UE C 108 are located, it routes the forwarded session invitation to the closest POI to the PSTN 112, which is the POI 114 in the region 1 100. So the BGCF 128 sends the session invitation to the MGCF 116 handling POI 114. The MGCF 116 then converts the session invitation to a corresponding telephone call setup request compatible with the PSTN 112. Then the PSTN 112 takes care of the routing of the telephone call setup request to the UE C 108 in region 2 102.

As can be derived from the above routing example, the handling of the session is not efficient as the routing of the corresponding telephony call from region 1 100 to region 2 102 is done by the PSTN 112, which involves usage of expensive PSTN resources. In this case the IMS network 101 operator has to pay a high termination fee to the PSTN 112 operator. The termination fee is typically proportional to the routing distance in the network until the termination point is reached, which in this case is the PSTN 112 UE C 108. There is clearly a need to improve the routing of communication sessions from the IMS network 101 to the PSTN 112, or in general to other communication networks, in terms of efficiency.

SUMMARY

It is an object of the invention to improve the routing of communication sessions to other communication networks. It is also an object of the invention to provide corresponding methods, nodes, and instruction sets or computer programs.

The objects defined above are solved by the features of the independent claims. Preferred embodiments of the invention are described in the dependent claims.

According to an exemplary aspect of the invention, a method for routing a session invitation from a first communication network to a second communication network is provided. The first communication network and the second communication network are interconnected via at least two points of interconnect, the first communication network and the second communication network are stretching across at least two common geographical regions; the at least two points of interconnect are located in different common geographical regions. The method comprises receiving, by a first control node, a session invitation to a first user equipment, the first control node and the first user equipment are part of the first communication network. The method further comprises determining, by the first control node, whether a breakout condition for routing of the session invitation to the second communication network is fulfilled. The method further comprises based on a result of determining, selecting, by a second control node, one of the at least two points of interconnect to the second communication network, the second control node is part of the first communication network; wherein the selection is considering a capability information characterizing capabilities of the first control node.

The method may further comprise receiving, by a third control node, the capability information from a subscriber database, the third control node being part of the first communication network. The method may further comprise subsequent to the reception of the capability information, sending, by the third control node, a registration request to the first control node, wherein the registration request comprises the capability information.

According to another exemplary aspect of the invention, a method in a control node for routing a session invitation from a first communication network to a second communication network is provided. The control node is part of the first communication network. The method further comprises determining whether a breakout condition for routing of a session invitation to the second communication network is fulfilled. The method further comprises subsequent to the determining of the breakout condition, sending the session invitation to a second control node, wherein the session invitation comprises capability information characterizing capabilities of the control node, if the capability information is stored in the control node.

According to another exemplary aspect of the invention, a method in a control node for routing a session invitation from a first communication network to a second communication network is provided. The first communication network and the second communication network are interconnected via at least two points of interconnect. The first communication network and the second communication network are stretching across at least two common geographical regions. The at least two points of interconnect are located in different common geographical regions. The control node is part of the first communication network. The method further comprises receiving a session invitation to a user equipment, the session invitation comprising capability information characterizing capabilities of a first control node, wherein the user equipment is part of the second communication network, and the first control node is part of the first communication network. The method further comprises selecting one of the at least two points of interconnect to the second communication network, wherein the selection is considering the capability information.

The method may further comprise subsequent to the selection of one of the at least two points of interconnect, determining a route to the selected point of interconnect, wherein the route utilizes a transport backbone of the first communication network to reach the selected point of interconnect.

According to another exemplary aspect of the invention, a method in a control node for registration of a user equipment in a first communication network is provided. The control node and the user equipment are part of the first communication network. The method comprises receiving a query response from a subscriber database comprising capability information characterizing capabilities required for a first control node, wherein the capability information comprises information in which geographical region of the first communication network the user equipment is located. The method further comprises selecting a first control node considering the received capability information, wherein the first control node is part of the first communication network. The method further comprises sending a registration request to the first control node, wherein the registration request comprises the capability information.

According to another exemplary aspect of the invention, a control node for routing a session invitation from a first communication network to a second communication network is provided. The control node is part of the first communication network. The control node is capable of determining whether a breakout condition for routing of a session invitation to the second communication network is fulfilled. The control node is further capable of, subsequent to the determining of the breakout condition, sending the session invitation to a second control node, wherein the session invitation comprises capability information characterizing capabilities of the control node, if the capability information is stored in the control node.

According to another exemplary aspect of the invention, a control node for routing a session invitation from a first communication network to a second communication network is provided. The first communication network and the second communication network are interconnected via at least two points of interconnect. The first communication network and the second communication network are stretching across at least two common geographical regions. The at least two points of interconnect are located in different common geographical regions. The control node is part of the first communication network. The control node is capable of receiving a session invitation to a user equipment, the session invitation is comprising capability information characterizing capabilities of a first control node, wherein the user equipment is part of the second communication network, and the first control node is part of the first communication network. The control node is further capable of selecting one of the at least two points of interconnect to the second communication network, wherein the selection is considering the capability information.

According to another exemplary aspect of the invention, a control node for registration of a user equipment in a first communication network is provided. The control node and the user equipment are part of the first communication network. The control node is capable of receiving a query response from a subscriber database comprising capability information characterizing capabilities required for a first control node, wherein the capability information comprises information in which geographical region of the first communication network the user equipment is located. The control node is further capable of selecting a first control node considering the received capability information, wherein the first control node is part of the first communication network. The control node is further capable of sending a registration request to the first control node, wherein the registration request comprises the capability information.

According to another exemplary aspect of the invention, a system for routing a session invitation from a first communication network to a second communication network is provided. The system comprises a first control node and a second control node. Alternatively the system comprises a first control node and a second control node and a third control node.

The foregoing and other objects, features and advantages of the present invention will become more apparent in the following detailed description of embodiments of the invention illustrated in the accompanying drawings.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 1A:
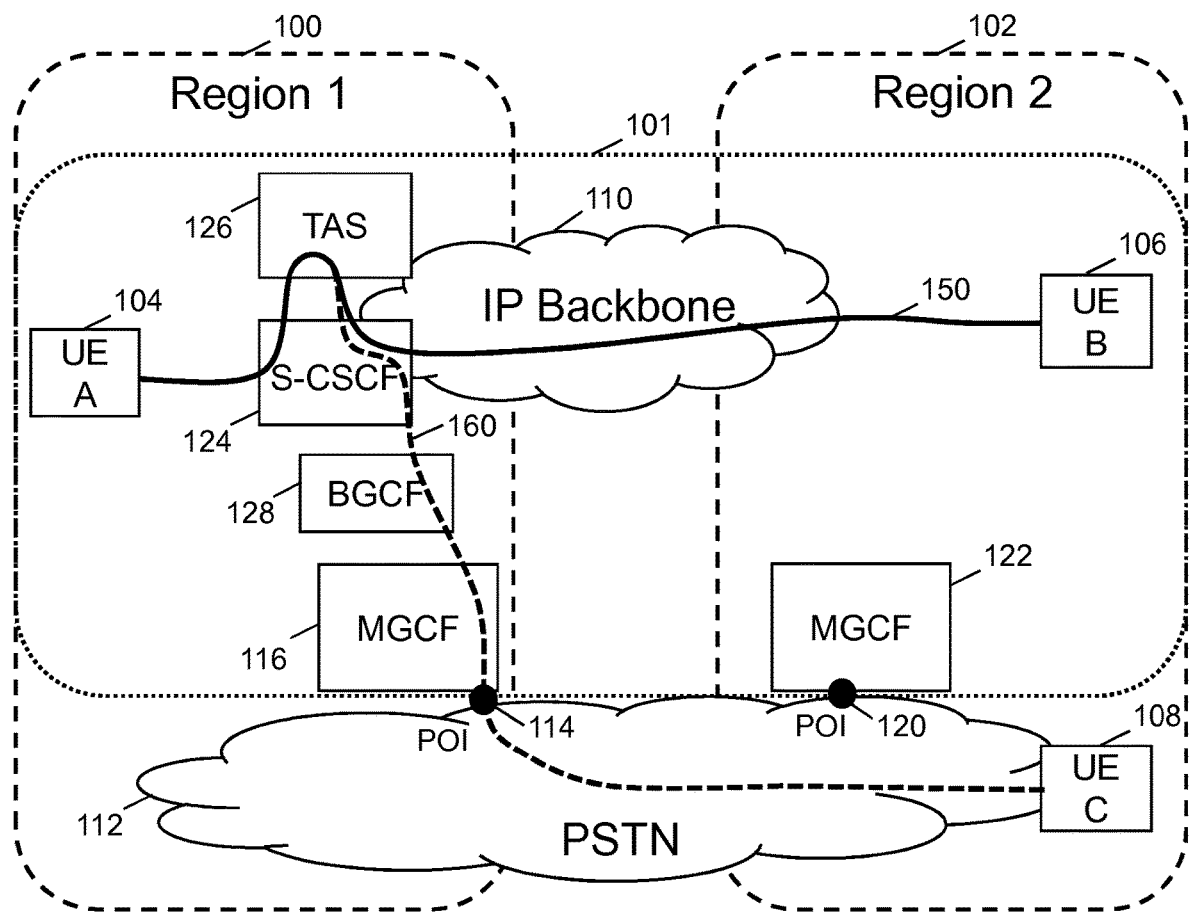
FIG. 1a shows a block diagram illustrating a system for state of the art routing of a session invitation from a first communication network to a second communication network.

In the following, methods and nodes for routing a session invitation from a first communication network to a second communication network and associated instruction set or computer program according to the invention are described in more detail.

Within the context of the present application, the term "communication network" may particularly denote a collection of nodes or entities, related transport links, and associated management needed for running a service, for example a telephony service or a packet transport service. Depending on the service, different node types or entities may be utilized to realize the service. A network operator owns the communication network, and offers the implemented services to its subscribers. Typical examples of a communication network are radio access network (such as GSM, 3G, WCDMA, CDMA, LTE, 802.11), mobile backhaul network, or core network (such as IMS, CS (Circuit Switched), or Packet Core).

Within the context of the present application, the term "control node" refers to a node of the communication network primarily performing control procedures for sessions and services of a subscriber of the communication network. The term typically refers to those entities of the communication network handling control plane, subscriber data, services, or signaling traffic associated with user traffic in the communication network. In a core network a control node may be a MME (Mobility Management Entity), P-CSCF (Proxy-CSCF), S-CSCF, or TAS nodes.

Within the context of the present application, the term "Point of Interconnect" refers to a point where two communication networks are interconnected. In practical realizations several POIs exist between each two communication networks, and the POIs are geographically distributed. This allows to load balance the traffic between two communication networks, but also to influence the termination fee. When there is a choice, it is cheaper to route a call via the POI as close as possible to the geographical location of the terminating subscriber.

Within the context of the present application, the term "termination fee" refers to a fee to be paid per call or session by the originating communication network operator to the communication network operator operating the network where the call or session is terminated. It is calculated based on the geographical distance from the entry POI to the termination point in the terminating communication network.

Within the context of the present application, the term "user equipment" refers to a device for instance used by a person for his or her personal communication. It can be a telephone type of device, for example a fixed telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines.

Within the context of the present application, the term "session invitation" refers to a control signaling used to establish a communication session or a telephone call. Within the context of IMS, the control signaling may be SIP based. Within the context of PSTN, the control signaling may be ISUP (Integrated Services Digital Network User Part) or TUP (Telephony User Part) based.

Within the context of the present application, the term "breakout" refers to the routing of a communication session or a telephone call from the own network to a peering other network via a POI. So the communication session or a telephone call breaks out of the own network to other networks.

Within the context of the present application, the term "capability information: refers to a set of information characterizing the capabilities of a control node and capabilities required by a subscriber. The capabilities may for example be related to the handling of communication sessions (e.g. specific audio or video capabilities) or also be related to the characteristics of a subscriber or UE (e.g. type of subscriber, type of UE, or geographical position of the UE).

Figure 1B:
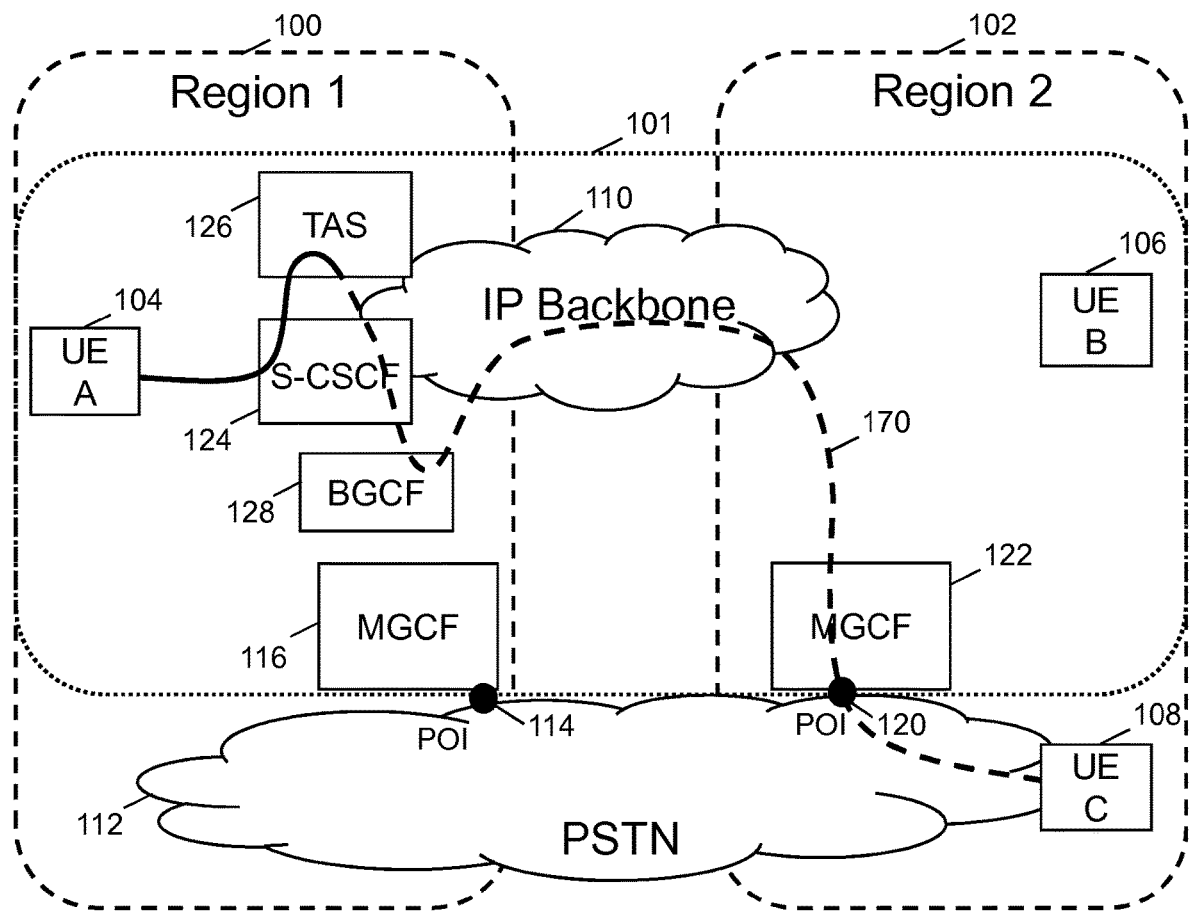
FIG. 1b shows a block diagram illustrating a system for efficient routing a session invitation from a first communication network to a second communication network according to the invention.

Referring now to FIG. 1b, this figure shows a block diagram illustrating a system for efficient routing a session invitation from a first communication network to a second communication network.

The first communication network 101 and the second communication network 112 may be interconnected via at least two points of interconnect 114, 120. The first communication network 101 and the second communication network 112 may be stretching across at least two common geographical regions 100, 102, and the at least two points of interconnect 114, 120 may be located in different common geographical regions 100, 102.

FIG. 1b illustrates the same network scenario as introduced in the background section. However, instead of the state of the art routing paths 150, 160, now an efficient network routing path from the first communication network 101 to the second communication network 112 is depicted by a dashed line 170.

The first communication network 101 may correspond to an IMS network and the second communication network 112 may correspond to a PSTN.

In this scenario the S-CSCF 124, which may correspond to a first control node 124, may be receiving 550 a session invitation to a first user equipment 106, which may correspond to UE B 106. The S-CSCF 124 and the UE B 106 may be part of the first communication network 101, which corresponds to the IMS network 101.

The S-CSCF 124 may involve the TAS 126 for execution of terminating services of the B-subscriber using the UE B 106. Session forwarding is an example of terminating services being executed by the TAS 126. Session forwarding is also an example of a terminating service which may change the destination of the session invitation to target now the UE C 108.

The S-CSCF 124, which corresponds to a first control node 124, may be determining whether a breakout condition for routing of the session invitation to the second communication network 112 is fulfilled, which corresponds to the PSTN 112. By checking the destination of the session invitation, the S-CSCF 124 may determine that a routing of the session invitation to another communication network, so a breakout may have to be done. In this scenario the breakout condition may be associated with a session invitation forwarding to a second user equipment 108. The second user equipment 108 may be located in the second communication network, the PSTN 112.

In this scenario it is assumed that the B-subscriber may eventually have two UEs. The first UE 106 may be an IMS SIP phone, while the B-subscriber has as well an old PSTN phone, which may correspond to the UE C 108. So the B-subscriber may want to forward all incoming calls to his PSTN phone UE C 108 instead of reaching his IMS phone UE B 108. Another possible scenario may be that PSTN phone UE C 108 belongs to a further subscriber, a C-subscriber. But taking subscriber behavior statistics into account, it may be very likely that this C-subscriber is located close to, at least in the same region 102 as the B-subscriber.

In the next step, so subsequent to the determining 555 of the breakout condition, the S-CSCF 124 may be sending the session invitation to the BGCF 128, which corresponds to the second control node 128, wherein the session invitation may comprise a capability information characterizing capabilities of the S-CSCF 124. In this scenario the capability information may comprise information in which geographical region 100, 102 of the first communication network 101 the first user equipment 106 may be located. During the registration process of the UE B 106 into the IMS network 101 the S-CSCF 124 for the UE B 106 was selected to match the capability demands of the UE B 106 and the B-subscriber.

In this scenario an identity of the subscriber using the first user equipment 106 may not comprise information in which geographical region 100, 102 of the first communication network 101 the first user equipment 106 may be located. Here it is assumed that the B-subscriber does not have a TEL IMPU, but only a SIP IMPU with a common domain part for all subscribers in region 1 100 and region 2 102, for example subscribername@sip.IMSoperator.com. Here "IMSoperator" would correspond to the common domain part. So the common domain part would not reveal in which region the UE is located. So the identity of the subscriber using the first user equipment 106 may be a SIP IMPU comprising a domain part common for all the geographical regions 100, 102 of the first communication network 101.

In the next step the BGCF 128 may receive the session invitation to UE C 108, wherein the session invitation may comprise the capability information characterizing capabilities of the S-CSCF 124. So based on a result of determining the breakout condition, the BGCF 128 may be selecting one of the at least two points of interconnect 114, 120 to the PSTN 112, wherein the selection may be considering the capability information characterizing capabilities of the S-CSCF 124.

Since the received capability information may comprise information in which geographical region 100, 102 of the IMS network 101 the first UE 106 may be located, it is possible for the BGCF 128 to select the POI 120 closest to the UE B 106. As described above, it may be assumed that the UE B 106 is very close to the UE C 108, it is efficient to select the POI 120 closest to the UE B 106, whereby closest may mean in the same geographical region 102.

The POI 120 may be handled by the MGCF 122, therefore the BGCF 128 determines subsequent to the selection of one of the at least two points of interconnect 114, 120, a route to the selected point of interconnect 120, wherein the route utilizes a IP backbone transport network 110 of the IMS network 101 to reach the selected point of interconnect 120.

The MGCF 120 handles the POI 120 and converts the session invitation into a corresponding telephone call setup request and passes this request via the POI 120 to the PSTN 112. The PSTN 120 then routes the telephone call setup request to the UE C 108.

The entire routing path is illustrated by the dashed line 170.

Figure 2:
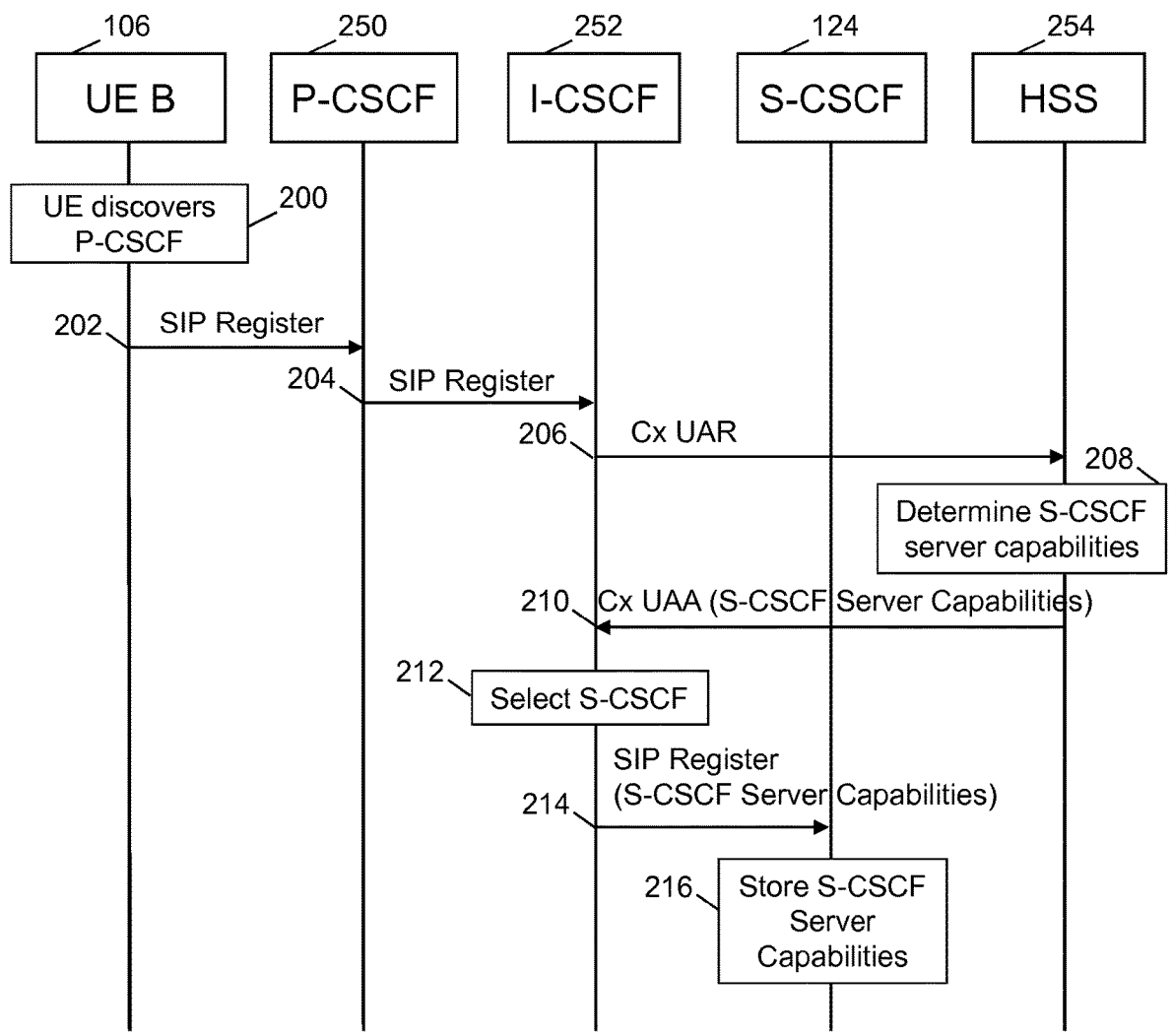
FIG. 2 shows a procedure flow diagram illustrating the registration of a UE into an S-CSCF according to the invention.

Referring now to FIG. 2, this figure shows a procedure flow diagram illustrating the registration of a UE B 106 into an S-CSCF 124.

Before a UE B 106 can initiate or receive sessions, it has to register itself into the IMS network 101, i.e. into an S-CSCF 124 being responsible for handling the UE B 106. During the registration process also the capability information characterizing capabilities of the S-CSCF 124 may be stored into the S-CSCF 124.

The registration procedure may start in 200 with the UE B 106 performing a discovery of the P-CSCF 250 (Proxy-CSCF) according to the state of the art. When the UE B 106 has determined the address of the P-CSCF 250, the UE B 106 may send a registration request 202 to the P-CSCF 250. Since an IMS network is based on SIP signaling protocol, the UE B 106 may send a SIP Register message.

The P-CSCF 250 may receive the SIP Register message 202 and forward the SIP Register message in 204 to an I-CSCF 252 (Interrogating-CSCF). The task of the I-CSCF 252 is to select an S-CSCF for the UE B 106. To perform this task, the I-CSCF 252 may have to collect information on the subscriber using the UE B 106 and the services the subscriber may have subscribed to and what capabilities may be required from the S-CSCF to be selected.

For determining this information, the I-CSCF 252 may send a request 206 to a HSS 254 (Home Subscribers Server). The interface between an I-CSCF and a HSS is defined in 3GPP as so called Cx-interface. The message the I-CSCF 252 may use to query the HSS may be a diameter UAR (User Authentication Request) 206. Also other diameter messages types may be possible to use.

The HSS 254 may receive the UAR message 206 and do a lookup on the subscriber profile and determine the S-CSCF server capabilities. The S-CSCF server capabilities may be specific for the subscriber and may comprise information in which geographical region 100, 102 of the IMS network 101 the UE B 106 is located. This capability information, corresponding to the S-CSCF server capabilities, may be provisioned into the subscriber database, corresponding to the HSS 254, by a network operator of the IMS network 101 as part of subscriber data related to a subscriber using the UE B 106.

The HSS 254 may response to the query 206 to the I-CSCF 252 by sending a diameter UAA (User Authentication Answer) message 210 via the Cx-interface to the I-CSCF 252. This diameter message 210 may comprise, among other information, the determined required S-CSCF server capabilities.

The I-CSCF 252 may be receiving the S-CSCF server capabilities, which correspond to the capability information, from the HSS 254 in the diameter UAA message 210. Based on this information the I-CSCF 252 may select in 212 an S-CSCF 124 which matches with the determined required S-CSCF server capabilities.

Subsequent to the reception of the S-CSCF server capabilities the I-CSCF 252 may be sending a registration request, which corresponds to a SIP Register message 214, to the S-CSCF 124, which corresponds to a first control node 124, wherein the registration request comprises the S-CSCF server capabilities. So the I-CSCF 252 forwards in 214 the S-CSCF server capabilities received from the HSS 254 to the selected S-CSCF 124.

The S-CSCF 124 may receive the SIP Register message 214 comprising the S-CSCF server capabilities. The S-CSCF 124 then stores the received S-CSCF server capabilities. The received S-CSCF server capabilities comprise information in which geographical region 100, 102 of the IMS network 101 the UE B 106 is located.

The information in which geographical region 100, 102 of the IMS network 101 the UE B 106 is located is stored together with the subscriber information for that served subscriber. So the same S-CSCF 124 can serve subscribers in different regions with different S-CSCF server capabilities provisioned.

Figure 3:
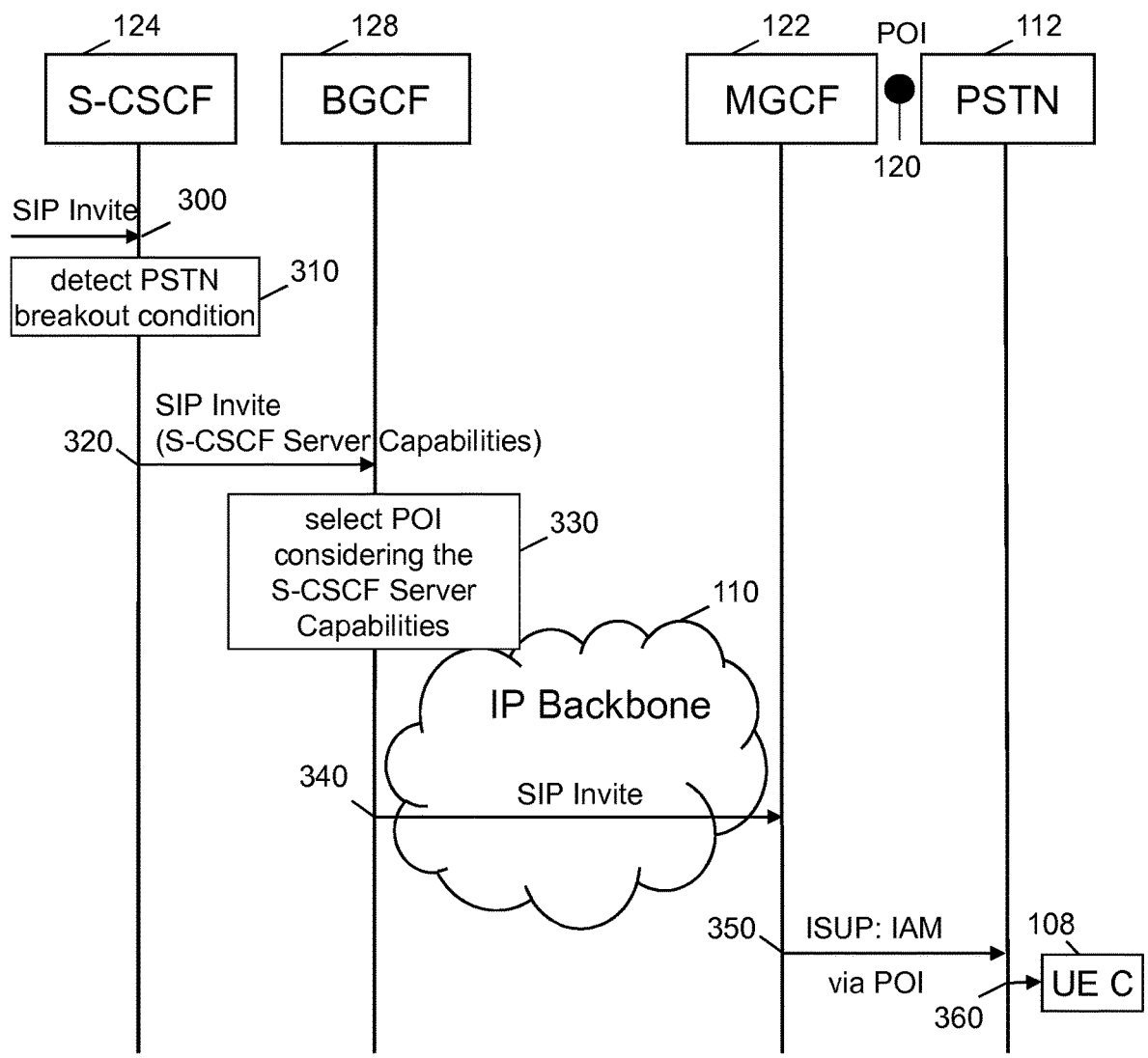
FIG. 3 shows a procedure flow diagram illustrating the breakout of a SIP session invitation to a PSTN according to the invention.

Referring now to FIG. 3, this figure shows a procedure flow diagram illustrating the breakout of a SIP session invitation to a PSTN.

This procedure flow diagram illustrates in more detail the handling of a session invitation, corresponding to a SIP Invite message, as shown in FIG. 1b. A SIP Invite message 300 may be received in the S-CSCF 124, which may correspond to a first control node.

The S-CSCF 124 may in step 310 determine whether a breakout condition is fulfilled where the SIP Invite message shall be routed to a UE C 108 located in another communication network such as the PSTN 112. This breakout condition may be caused by execution of a subscriber service such as session forwarding.

If the S-CSCF 124 has detected such breakout condition, the S-CSCF 124 forwards the SIP Invite message 320 to the BGCF 128 responsible for handling the breakout of SIP Invite messages. The SIP Invite message 320 may comprise the S-CSCF server capabilities as stored in the S-CSCF 124 during the registration procedure as shown in FIG. 2. The S-CSCF server capabilities may comprise, among other information, information in which geographical region 100, 102 of the IMS network 101 the UE B 106 may be located.

The BGCF 128 may receive the SIP Invite message 320 comprising the S-CSCF server capabilities. The BGCF 128 may now select in step 330 the POI 114, 120 to be used for the breakout of the SIP Invite message to the PSTN 112. For doing this selection of the POI 114, 120 the BGCF 128 may consider the received S-CSCF server capabilities to select the POI 120 located in the geographical region 102 where the UE B 106 may be located. This selection assumes that the UE B 106 may be located close to the UE C 108.

After having selected POI 120, the BGCF 128 determines a routing path 160 to the MGCF 122 handling the POI 120. The BGCF 128 may forward the SIP Invite message 340 to the MGCF 122 in a way that the route utilizes an IP backbone transport backbone 110 of the IMS network 101 to reach the selected POI 120.

The MGCF 122 may receive the SIP Invite message 340 and may convert the message into a call setup request message compatible with the control signaling used in the PSTN 112, such as an ISUP IAM (Initial Address Message) message 350. Then the MGCF 122 may send the ISUP IAM message 350 via the POI 120 to the PSTN 112 which then delivers the call setup request in step 360 to the UE C 108.

Figure 4:
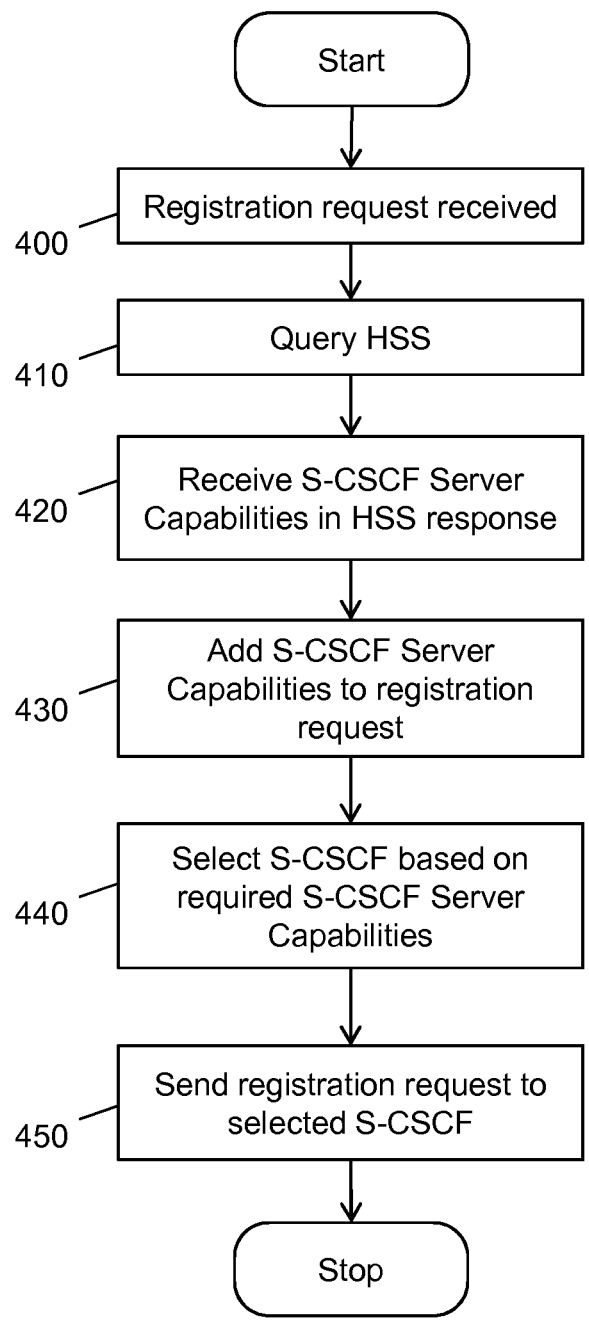
FIG. 4 shows a flow diagram illustrating a method in a third control node in the first communication network according to the invention.

Referring now to FIG. 4, this figure shows a flow diagram illustrating a method in a third control node in the first communication network. The third control node may correspond to an I-CSCF 252 and the first communication network may correspond to an IMS network 101.

The flow may start when receiving 400 a registration request. This registration request may correspond to a SIP Register message.

In step 410 the I-CSCF 252 may query the HSS 254 for information on the required S-CSCF server capabilities. The S-CSCF server capabilities may comprise, among other information, information in which geographical region 100, 102 of the IMS network 101 the UE B 106 may be located.

The HSS 254 may respond and in step 420 the I-CSCF 252 may receive the required S-CSCF server capabilities.

In step 430 the I-CSCF 252 may add the received the required S-CSCF server capabilities to the received registration request message.

In step 440 the I-CSCF 252 may select an S-CSCF 124 taking into account the received required S-CSCF server capabilities.

In step 450 the I-CSCF 252 may send the registration request to the selected S-CSCF 124, wherein the registration request comprises the S-CSCF server capabilities and the flow ends.

Figure 5A:
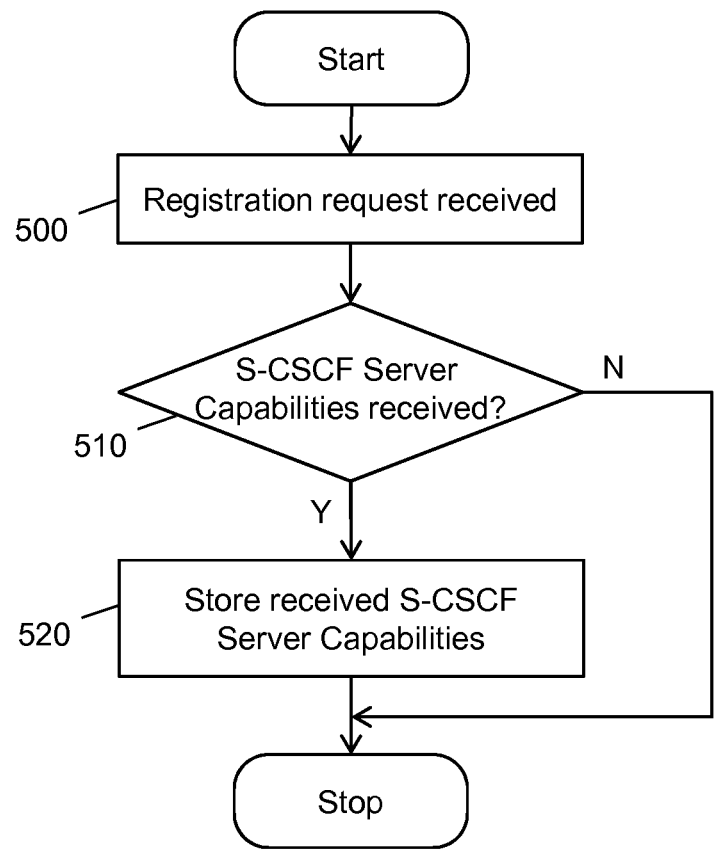
FIG. 5a shows a first flow diagram illustrating a first method in a first control node in the first communication network according to the invention.

Referring now to FIG. 5a, this figure shows a first flow diagram illustrating a first method in a first control node in the first communication network. The first control node may correspond to an S-CSCF 124 and the first communication network may correspond to an IMS network 101.

The flow may start when receiving 500 a registration request. This registration request may correspond to a SIP Register message.

The S-CSCF 124 then checks in 510 if S-CSCF server capabilities have been received. If this is not the case, so the answer is no, the flow ends.

If the S-CSCF 124 has received S-CSCF server capabilities, so the answer to the check 510 is yes, the S-CSCF 124 may store 520 the received S-CSCF server capabilities and the flow ends. The received S-CSCF server capabilities may comprise information in which geographical region 100, 102 of the IMS network 101 the UE B 106 is located.

The information in which geographical region 100, 102 of the IMS network 101 the UE B 106 is located may be stored together with the subscriber information for that served subscriber. So the same S-CSCF 124 may serve subscribers in different regions with different S-CSCF server capabilities provisioned.

Figure 5B:
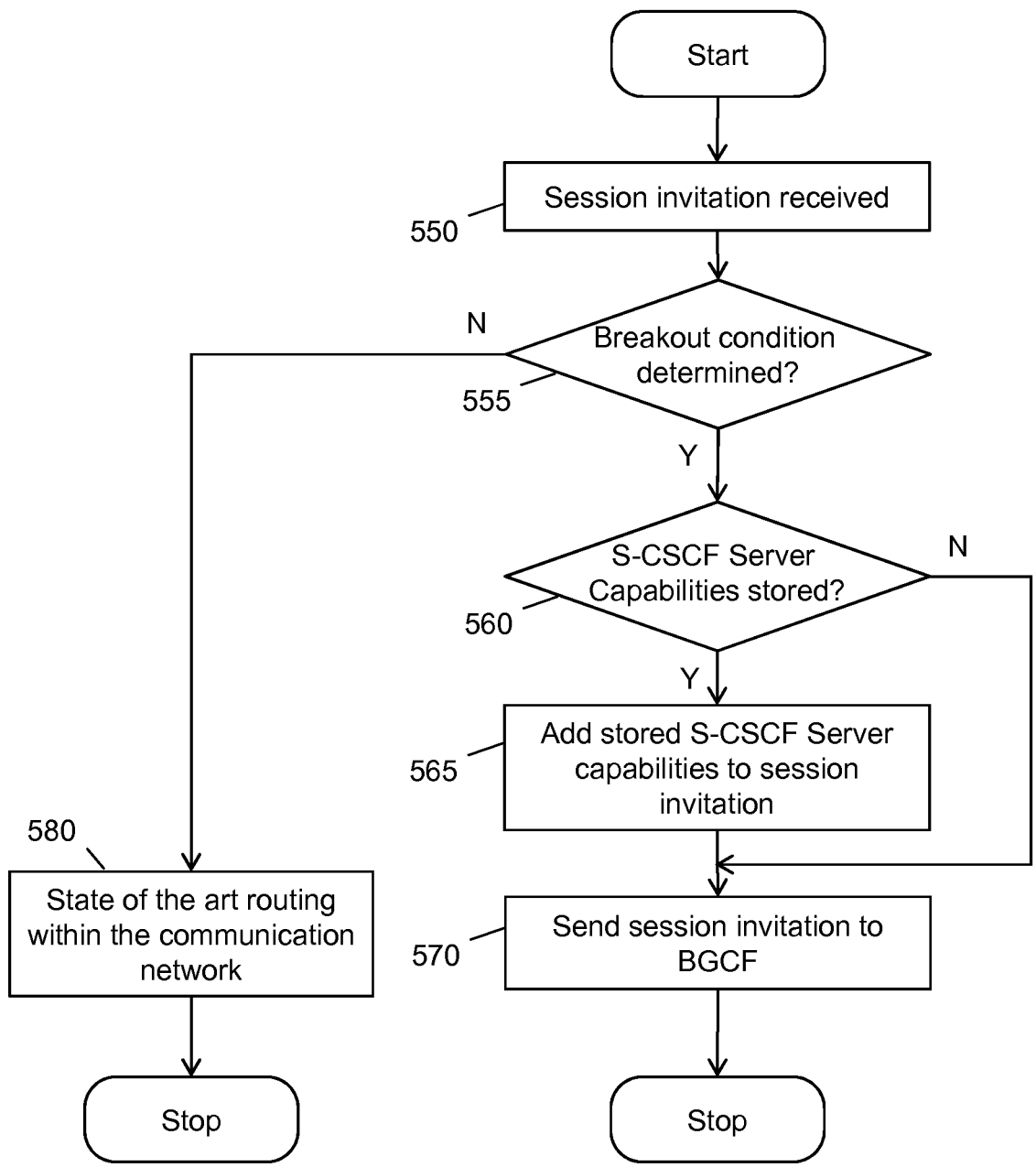
FIG. 5b shows a second flow diagram illustrating a second method in a first control node in the first communication network according to the invention.

Referring now to FIG. 5b, this figure shows a second flow diagram illustrating a second method in a first control node in the first communication network. The first control node may correspond to an S-CSCF 124 and the first communication network may correspond to an IMS network 101.

The flow may start when receiving 550 a session invitation. This session invitation may correspond to a SIP Invite message.

In step 555 the S-CSCF 124 may determine whether a breakout condition is fulfilled where the session invitation shall be routed to a UEC 108 located in another communication network such as the PSTN 112. This breakout condition may be caused by execution of a subscriber service such as session forwarding.

If breakout condition is not fulfilled, so the answer to the check 555 is no, state of the art routing within the IMS network 101 according to step 580 may be applied and the flow ends.

If breakout condition is fulfilled, so the answer to the check 555 is yes, the S-CSCF 124 may check in 560 whether S-CSCF server capabilities are stored in the S-CSCF 124. If no S-CSCF server capabilities are stored in the S-CSCF 124, so the answer to the check 560 is no, the S-CSCF 124 may send 570 the session invitation to the BGCF 128. Then the flow ends. In this case the session invitation to the BGCF does not comprise any S-CSCF server capabilities.

If S-CSCF server capabilities are stored in the S-CSCF 124, so the answer to the check 560 is yes, the S-CSCF 124 may add in 565 the stored S-CSCF server capabilities to the session invitation message. The added S-CSCF server capabilities may comprise information in which geographical region 100, 102 of the IMS network 101 the UE B 106 is located.

The S-CSCF 124 may then send 570 the session invitation to the BGCF 128. In this case the session invitation to the BGCF may comprise S-CSCF server capabilities. Then the flow ends.

Figure 6:
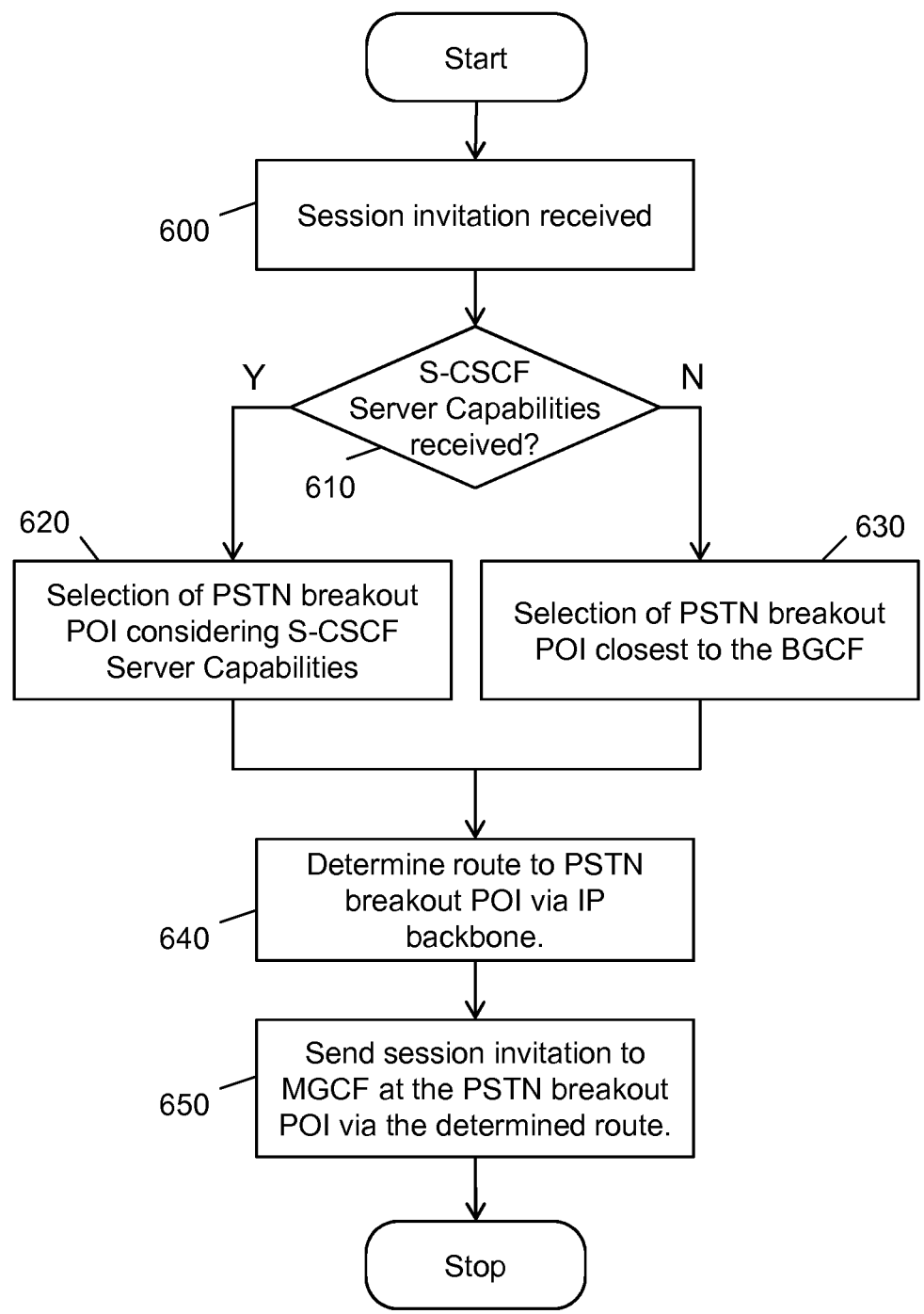
FIG. 6 shows a flow diagram illustrating a method in a second control node in the first communication network according to the invention.

Referring now to FIG. 6, this figure shows a flow diagram illustrating a method in a second control node in the first communication network. The second control node may correspond to a BGCF 128 and the first communication network may correspond to an IMS network 101.

The flow may start when receiving 600 a session invitation. This session invitation may correspond to a SIP Invite message.

In step 610 the BGCF 128 may determine whether S-CSCF server capabilities have been received. If no S-CSCF server capabilities have been received, so the answer to the check 610 is no, the selection 630 of a PSTN breakout POI may be done by selecting the POI closest to the BGCF 128.

If S-CSCF server capabilities have been received, so the answer to the check 610 is yes, the selection 620 of a PSTN breakout POI may be done considering the received S-CSCF server capabilities. The considered S-CSCF server capabilities may comprise information in which geographical region 100, 102 of the IMS network 101 the UE B 106 is located. The BGCF 128 may consider the received S-CSCF server capabilities when selecting the POI 120 located in the geographical region 102 where the UE B 106 may be located. This selection assumes that the UE B 106 may be located close to the UE C 108.

The flow then continues with step 640. When this step is reached, the POI to the PSTN may have been selected, either by step 630 selecting the POI closest to the BGCF 128, or by step 620 considering the received S-CSCF server capabilities. The BGCF 128 then may determine a route to the PSTN 112 breakout POI 120 via the IP backbone transport network 110.

Then in step 650 the BGCF 128 may send the session invitation to the MGCF 122 handling the PSTN 112 breakout POI 120 via the determined route and the flow ends.

Figure 7:
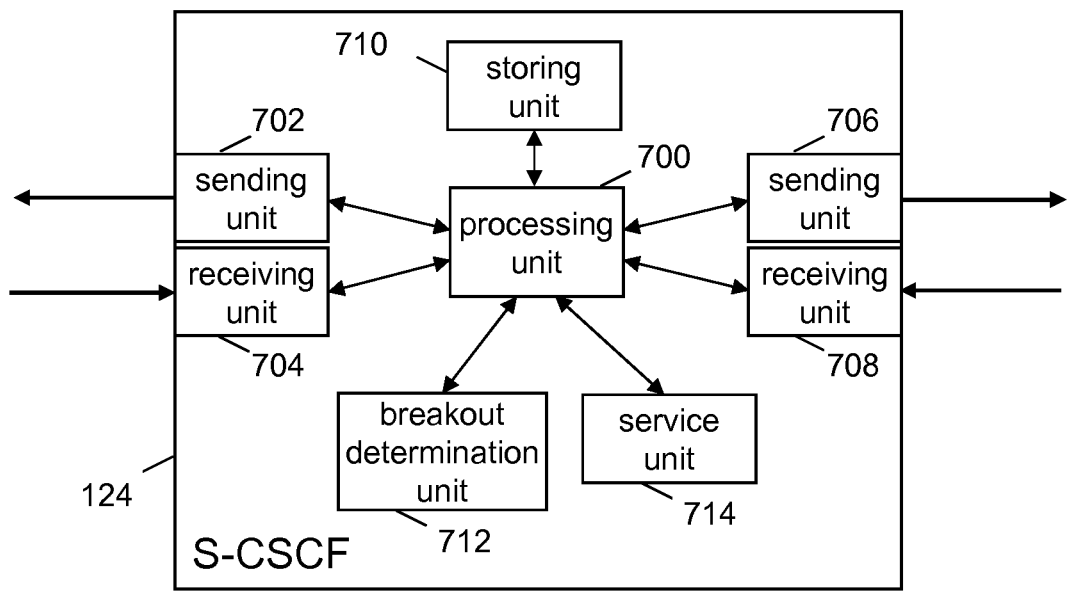
FIG. 7 shows a block diagram illustrating a first control node in the home communication network according to the invention.

Referring now to FIG. 7, this figure shows a block diagram illustrating a first control node in the home communication network. The illustrated entity may correspond to the S-CSCF 124. The first control node 124 may be adapted to perform one or more steps of the above described methods shown in FIGS. 5a, 5b.

The S-CSCF 124 may comprise a number of functional units, which are described in further detail below and which are adapted to perform respective method steps.

A processing unit 700 of the S-CSCF 124 may be adapted to determining whether a breakout condition for routing of a session invitation to the second communication network 112 is fulfilled. The breakout condition may be associated with a subscriber service invocation resulting in a session invitation forwarding to a second user equipment 108, the second user equipment 108 being located in the second communication network 112. The subscriber service may be a session forwarding service. The processing unit 700 may further be adapted to, subsequent to the determining of the breakout condition, send the session invitation to a second control node 128, wherein the session invitation comprises capability information characterizing capabilities of the 25 control node 124, if the capability information is stored in the control node 124. In a practical implementation the processing unit 600 may be one processor taking care of all the above functions, or may also be distributed over more than one processor, wherein the functions are distributed over the available processors.

The S-CSCF 124 may further comprise a sending unit 702 and a receiving unit 704 via which the S-CSCF 124 can communicate with the I-CSCF 252 or with other nodes of the IMS network 101. The S-CSCF 124 may also comprise a sending unit 706 and a receiving unit 708 via which the S-CSCF 124 can communicate with the BGCF 128 or with other nodes of the IMS network 101. The sending unit 702, 706 and the receiving unit 704, 708 may be part of a respective interface, respectively. Alternatively, the S-CSCF 124 may comprise a single send and receive interface. This interface could then be used for both the communication with the further nodes of the IMS network 101 and with the BGCF 128 and I-CSCF 252. The sending unit 702, 706 may send out signaling messages composed by the processing unit 700. The receiving unit 704, 708 may receive signaling messages originating from the I-CSCF 252 and other nodes of the IMS network 101, and forward the received signaling messages to the processing unit 700 for handling.

The S-CSCF 124 may also comprise a storing unit 710 for storing information related to routing of sessions to other communication networks. The storing unit 710 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 710 may be used by the processing unit 700 to store information, for example the S-CSCF server capability, or program code.

The S-CSCF 124 may also comprise a breakout determination unit 712. The breakout determination unit 712 may perform on request from the processing unit 700 a function for determining whether a session needs to break out from the own communication network to other communication networks. This may be done via an analysis function analyzing the destination address of the session invitation message. Sub-elements of the destination address may be compared with a pre-stored information of the own network. If the analyzed sub-elements of the destination address do not match with the pre-stored information, a breakout to other communication networks is needed. This analysis result may be returned to the processing unit 700.

The S-CSCF 124 may also comprise a service unit 714. The service unit 714 may on request from the processing unit 700 check for subscriber services and may involve other nodes of the IMS network 101 such as a TAS 126 for triggering and execution of these subscriber services. For communication with the TAS 126 one of the interfaces 702, 704 or 706, 708 may be utilized. After the subscriber services have been handled, the service unit 714 may inform the processing unit 700.

Figure 8:
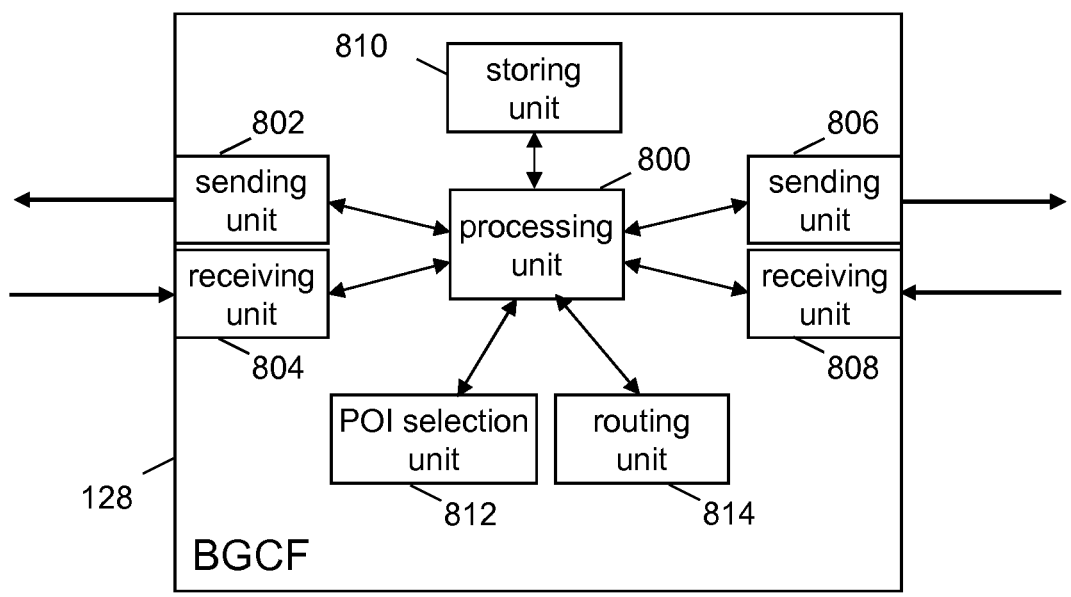
FIG. 8 shows a block diagram illustrating a second control node in the home communication network according to the invention.

Referring now to FIG. 8, this figure shows a block diagram illustrating a second control node in the home communication network. The illustrated entity may correspond to the BGCF 128. The first control node 128 may be adapted to perform one or more steps of the above described method shown in FIG. 6.

The BGCF 128 may comprise a number of functional units, which are described in further detail below and which are adapted to perform respective method steps.

A processing unit 800 of the BGCF 128 may be adapted to receive a session invitation to a user equipment 108, the session invitation comprising capability information characterizing capabilities of a first control node 124, wherein the user equipment 108 is part of the second communication network 112, and the first control node 124 is part of the first communication network 101. The processing unit 700 may further be adapted to select one of the at least two points of interconnect 114, 120 to the second communication network 112, wherein the selection is considering the capability information. The processing unit 700 may further be adapted to, subsequent to the selection of one of the at least two points of interconnect 114, 120, determine a route to the selected point of interconnect 120, wherein the route utilizes a transport backbone 110 of the first communication network 101 to reach the selected point of interconnect 120.

The BGCF 128 may further comprise a sending unit 802 and a receiving unit 804 via which the BGCF 128 can communicate with the S-CSCF 124 or with other nodes of the IMS network 101. The BGCF 128 may also comprise a sending unit 806 and a receiving unit 808 via which the BGCF 128 can communicate with the MGCF 122 or with other nodes of the IMS network 101. The sending unit 802, 806 and the receiving unit 804, 808 may be part of a respective interface, respectively. Alternatively, the BGCF 128 may comprise a single send and receive interface. This interface could then be used for both the communication with the further nodes of the IMS network 101 and with the MGCF 122 and S-CSCF 124. The sending unit 802, 806 may send out signaling messages composed by the processing unit 800. The receiving unit 804, 808 may receive signaling messages originating from the S-CSCF 124 and other nodes of the IMS network 101, and forward the received signaling messages to the processing unit 800 for handling.

The BGCF 128 may also comprise a storing unit 810 for storing information related to routing of sessions to other communication networks. The storing unit 810 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 810 may be used by the processing unit 800 to store information, for example a list of available POIs 114, 120 and possible routes via an IP backbone transport network 110 to a MGCF 122, or program code.

The BGCF 128 may also comprise a POI selection unit 812. The POI selection unit 812 may comprise a list of available POIs in the IMS network 101 and information what are the peering networks of these POIs. By a lookup function, triggered by a request from the processing unit 800, the POI selection unit 812 is able to determine the best suited POI for a given region 100, 102 and peering network 112. The selected POI 120 is returned to the processing unit 800.

The BGCF 128 may also comprise a routing unit 814. The routing unit 814 may be able to determine a route to a MGCF 116, 122 utilizing the IP backbone transport network 110 of the IMS network 101. The routing unit 814 may store a list of possible routes to a MGCF 116, 122 or have a network model of the IMS network 101 stored and may do routing path calculation on demand. The request for determine a route to a MGCF 116, 122 may come from the processing unit 800 and the determined route may be returned to the processing unit 800.

Figure 9:
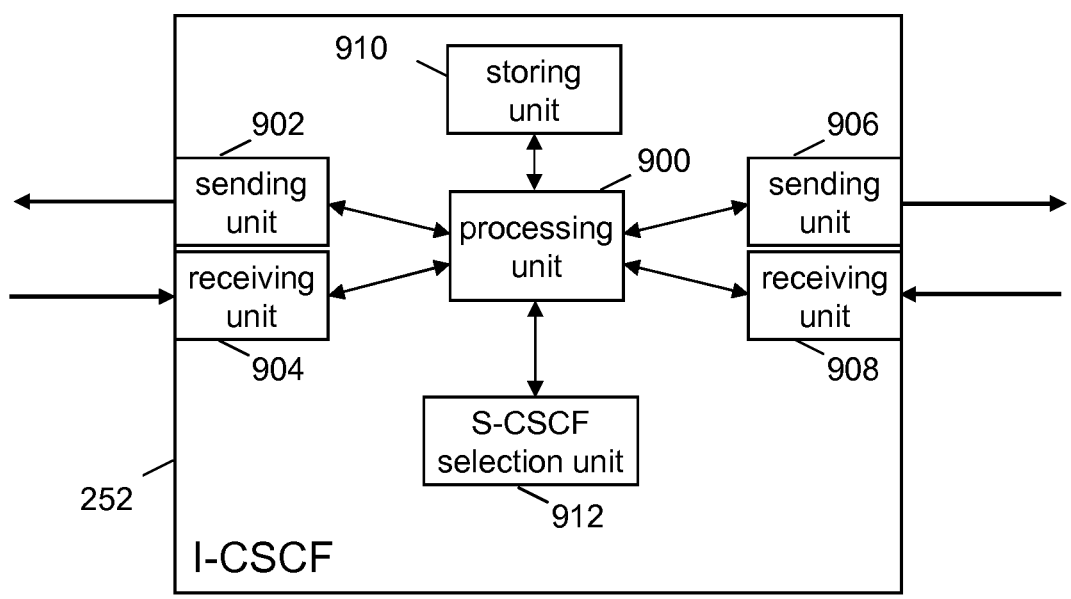
FIG. 9 shows a block diagram illustrating a third control node in the home communication network according to the invention.

Referring now to FIG. 9, this figure shows a block diagram illustrating a third control node in the home communication network. The illustrated entity may correspond to the I-CSCF 252. The third control node 252 may be adapted to perform one or more steps of the above described method shown in FIG. 4.

The I-CSCF 252 may comprise a number of functional units, which are described in further detail below and which are adapted to perform respective method steps.

A processing unit 900 of the I-CSCF 252 may be adapted to receive a query response from a subscriber database 254 comprising capability information characterizing capabilities required for a first control node 124, wherein the capability information comprises information in which geographical region 100, 102 of the first communication network 101 the user equipment 106 is located. The processing unit 900 may further be adapted to select a first control node 124 considering the received capability information, wherein the first control node 124 is part of the first communication network 101. The processing unit 900 may further be adapted to send a registration request to the first control node 124, wherein the registration request comprises the capability information.

The I-CSCF 252 may further comprise a sending unit 902 and a receiving unit 904 via which the I-CSCF 252 can communicate with the P-CSCF 250 or with other nodes of the IMS network 101. The I-CSCF 252 may also comprise a sending unit 906 and a receiving unit 708 via which the I-CSCF 252 can communicate with the S-CSCF 124 or with other nodes of the IMS network 101. The sending unit 902, 906 and the receiving unit 904, 908 may be part of a respective interface, respectively. Alternatively, the I-CSCF 252 may comprise a single send and receive interface. This interface could then be used for both the communication with the further nodes of the IMS network 101 and with the S-CSCF 124 and P-CSCF 250. The sending unit 902, 906 may send out signaling messages composed by the processing unit 900. The receiving unit 904, 908 may receive signaling messages originating from the P-CSCF 250 and other nodes of the IMS network 101, and forward the received signaling messages to the processing unit 900 for handling.

The I-CSCF 252 may also comprise a storing unit 910 for storing information related to routing of sessions to other communication networks. The storing unit 910 may comprise various types of memory such as volatile memory, non-volatile memory, hard disk drives, solid state drives, a network interface to a database or a data center, secure digital cards, or hardware such as smart cards, non-reversible chips, security chips, security modules, or trusted platform module devices. The storing unit 910 may be used by the processing unit 900 to store information, for example the S-CSCF server capability, or program code.

The I-CSCF 252 may also comprise an S-CSCF selection unit 912. The S-CSCF selection unit 912 may be utilized to select an S-CSCF 124 matching with the required S-CSCF server capabilities for a particular subscriber. On request from the processing unit 900 the S-CSCF selection unit 912 may compare the required S-CSCF server capabilities with a list of available S-CSCF in the IMS network 101 and their respective capabilities in order to find a suited S-CSCF 124 which then may be selected. A selected S-CSCF 124 may then be returned to the processing unit 900.

According to another embodiment, a set of instructions is provided. The set of instructions may be executed by the processing units 700, 800, 900 of the above mentioned control nodes 124, 128, 252 such that a method for routing of sessions to other communication networks as described above with reference to FIGS. 4, 5*a* and 5*b* may be carried out or be controlled. In particular, the control nodes 124, 128, 252 may be caused to operate in accordance with the above described method by executing the set of instructions.

The set of instructions may be embodied as executable processor code, for example a set of instructions product. The processor code may also be derivable from the set of instructions by compilation of the set of instructions.

A carrier may transport the set of instructions, wherein the carrier may be a signal of radio, optical, or electrical nature. By alternative, the carrier may be a disk or tape of magnetic or optical nature, a memory device, or simply paper.

The carrier may also be a computer readable medium, for example the storing unit 710, 810, 910 of the control nodes 124, 128, or 252, or the set of instructions may be configured as downloadable information.

According to another embodiment, a computer program, which, when being executed by at least one processor, is adapted to carry out or control a method for routing of sessions to other communication networks according to any one of claims 1 to 18.

One or more embodiments as described above may enable at least one of the following technical effects:

a session invitation may be routed in an efficient way from a IMS network 101 to a PSTN 112;

minimizing the usage of expensive PSTN 112 resources and maximizing the usage of the IMS network 101.

Modifications and other embodiments of the disclosed invention will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a control node for registration of a user equipment in a first communication network; the control node and the user equipment being part of the first communication network; the method comprising:
   receiving a query response from a subscriber database comprising capability information characterizing capabilities required for a first control node, wherein the capability information comprises information in which geographical region of the first communication network the user equipment is located;
   selecting a first control node based on the received capability information, wherein the first control node is part of the first communication network and selecting the first control node based on the received capability information comprises selecting the first control node based on a proximity of the first control node to the geographical region comprised in the received capability information; and
   sending a registration request to the first control node, wherein the registration request comprises the capability information.

2. A control node for registration of a user equipment in a first communication network; the control node and the user equipment being part of the first communication network; the control node comprising:
   one or more processing circuits configured to:
      receive a query response from a subscriber database comprising capability information characterizing capabilities required for a first control node, wherein the capability information comprises information in which geographical region of the first communication network the user equipment is located;
      select a first control node based on the received capability information, wherein the first control node is part of the first communication network and wherein, to select the first control node based on the received capability information, the one or more processing circuits are configured to select the first control node based on a proximity of the first control node to the geographical region comprised in the received capability information; and
      send a registration request to the first control node, wherein the registration request comprises the capability information.

3. A method of routing a session invitation, the method comprising:
   receiving a session invitation by a first control node in a first communication network;
   determining, by the first control node and based on a breakout condition, that routing of the session invitation requires a breakout from the first communication network to a second communication network, and sending the session invitation to a second control node that is part of the first communication network in response, wherein the second communication network is interconnected with the first communication network in at least two different geographical regions by at least one point of interconnect each;
   responsive to the determination by the first control node that the breakout is required, selecting, by the second control node and based on capability information characterizing capabilities of the first control node, one of the points of interconnect at which to breakout;
   sending the session invitation, by the second control node, toward the selected point of interconnect.

4. The method of claim 3, further comprising adding, by the first control node, the capability information to the session invitation before sending the session invitation to the second control node.

5. The method of claim 3, further comprising receiving, by a third control node in the first communication network, the capability information from a subscriber database, and in response, sending a registration request comprising the capability information to the first control node.

6. The method of claim 5, wherein the capability information is provisioned into the subscriber database by a network operator of the first communication network as part of subscriber data related to a subscriber using a first user equipment to which the session invitation is directed.

7. The method of claim 3, wherein the breakout condition is associated with session invitation forwarding to a second user equipment located in the second communication network.

8. The method of claim 3, wherein the capability information comprises information indicates in which geographical region of the first communication network a first user equipment to which the session invitation is directed is located.

9. The method of claim 3, wherein an identity of the subscriber using a first user equipment to which the session invitation is directed does not identify which geographical region of the first communication network the first user equipment is located within.

10. The method of claim 9, wherein the identity of the subscriber using the first user equipment is a Session Initiation Protocol (SIP) IP Multimedia Public Identity (IMPU) comprising a domain part common for all the geographical regions of the first communication network.

11. The method of claim 3, wherein the first communication network is an Internet Protocol Multimedia System (IMS) network.

12. The method of claim 3, wherein the second communication network is a Public Switched Telephone Network (PSTN).

13. The method of claim 3, wherein selecting the point of interconnect comprises selecting the point of interconnect located in the geographical region of the first communication network indicated by the capability information.

14. A method of routing a session invitation, implemented by a control node in a first communication network, the method comprising:
 determining, based on a breakout condition, that routing of a session invitation requires a breakout to a second communication network, wherein the second communication network is interconnected with the first communication network in at least two different geographical regions by at least one point of interconnect each;
 adding capability information characterizing capabilities of the control node to the session invitation;
 responsive to determining that the breakout is required, sending the session invitation, with the capability information added, to a second control node in the first communication network for further routing, relying on the second control node to determine which of the points of interconnect to use for the breakout.

15. The method of claim 14, further comprising receiving the capability information in a registration request from a third control node, and storing the capability information in the control node.

16. The method of claim 14, wherein the breakout condition is associated with a subscriber service invocation resulting in session invitation forwarding to a second user equipment located in the second communication network.

17. The method of claim 16, wherein the subscriber service is a session forwarding service.

18. A method of routing a session invitation, implemented by a control node in a first communication network, the method comprising:
 receiving a session invitation from a first control node in the first communication network, the session invitation comprising capability information characterizing capabilities of the first control node and the first communication network being interconnected with a second communication network in at least two different geographical regions by at least one point of interconnect each;
 responsive to a determination by the first control node that a breakout from the first communication network to the second communication network is required in order to route the session invitation, selecting one of the points of interconnect at which to perform the breakout based on the capability information in the session invitation;
 sending the session invitation toward the selected point of interconnect.

19. The method of claim 18, further comprising determining a route utilizing a transport backbone of the first communication network to reach the selected point of interconnect, and sending the session invitation toward the selected point of interconnect in accordance with the determined route.

20. The method of claim 18, wherein the points of interconnect comprise respective Media Gateway Control Functions (MGCF) of the first communication network.

21. A control node in a first communication network, the control node comprising:
 one or more processing circuits configured to:
  determine, based on a breakout condition, that routing of a session invitation requires a breakout to a second communication network, wherein the second communication network is interconnected with the first communication network in at least two different geographical regions by at least one point of interconnect each;
  add capability information characterizing capabilities of the control node to the session invitation;
  responsive to determining that the breakout is required, send the session invitation, with the capability information added, to a second control node in the first communication network for further routing, relying on the second control node to determine which of the points of interconnect to use for the breakout.

22. A control node in a first communication network, the control node comprising:
 one or more processing circuits configured to:
  receive a session invitation from a first control node in the first communication network, the session invitation comprising capability information characterizing capabilities of the first control node and the first communication network being interconnected with a second communication network in at least two different geographical regions by at least one point of interconnect each;
  responsive to a determination by the first control node that a breakout from the first communication network to the second communication network is required in order to route the session invitation, select one of the points of interconnect at which to perform the breakout based on the capability information in the session invitation;
send the session invitation toward the selected point of interconnect.

23. A system in a first communication network, the system comprising:
a first control node and a second control node;
wherein the first control node comprises one or more processing circuits configured to:
determine, based on a breakout condition, that routing of a session invitation requires a breakout to a second communication network, wherein the second communication network is interconnected with the first communication network in at least two different geographical regions by at least one point of interconnect each;
responsive to determining that the breakout is required, send the session invitation to the second control node for further routing, relying on the second control node to determine which of the points of interconnect to use for the breakout;
wherein the second control node comprises one or more processing circuits configured to, responsive to the determination by the first control node that the breakout is required in order to route the session invitation:
receive the session invitation from the first control node;
select one of the points of interconnect at which to perform the breakout based on capability information characterizing capabilities of the first control node comprised in the session invitation;
send the session invitation toward the selected point of interconnect.

24. The system of claim 23, further comprising a third control node comprising one or more processing circuits configured to:
receive a query response from a subscriber database comprising the capability information, wherein the capability information comprises information indicating which geographical region of the first communication network the user equipment is located within;
select the first control node based on the capability information received in the query response; and
send a registration request comprising the capability information to the first control node.

* * * * *